3,553,011
COIL-FORMING INSULATED ELECTRIC WIRES AND METHOD FOR SHAPING SAID WIRES INTO COILS

Harunobu Gunji, Tokyo, Noriyoshi Ohkura, Tokorozawa-shi, and Takashi Naganuma, Tokyo, Japan, assignors to Hitachi Cable, Ltd., and Hanashima Electric Wire Co., Ltd., both of Tokyo, Japan, both corporations of Japan
No Drawing. Filed Sept. 26, 1967, Ser. No. 670,773
Claims priority, application Japan, Dec. 9, 1966, 41/80,346, 41/80,347
Int. Cl. B44c 1/36; H01b 3/30
U.S. Cl. 117—218       12 Claims

ABSTRACT OF THE DISCLOSURE

A coil-forming insulated electric wire coated with an insulating material prepared by dissolving in a solvent 100 parts by weight of a base comprising an alcohol-soluble copolyamide resin with or without 5–100 parts by weight of a polyurethane elastomer, and 5–75 parts by weight of a functional resin which does not react with said resin to form any substantial three-dimensional structure, and baking the coating at about 400° C.

A coil shaping method, wherein the insulated wire is coiled and immersed in an alcohol for 1–60 seconds, or coiled in an alcohol atmosphere, and baked at 100°–200° C. for 10 minutes to 5 hours.

Said coil is superior to conventional coils in deformation and abrasion resistances, etc. In the present method, differing from the conventional, the braking is effected by employing only a high temperature furnace.

---

The present invention relates to a coil-forming insulated electric wire, which is used, e.g. for preparing a coil for communication instruments and apparatus etc., and to a method for shaping a coil of said insulating wire.

Generally, in producing a shaped coil article of an electric wire, there was adopted a method in which an insulated electric wire such as an enamel wire or fiber-wound wire was wound around a rod having a given shape and size, and the wire in a state maintaining the original coil shape is immersed in a varnish liquid, thereby impregnating with the varnish liquid the adjacent coiled portions of the electric wire, and then the varnish liquid was cured to form a shaped coil article. According to the above method, however, a long time is required for the varnish-impregnating treatment, and the operations are complex. In view of the above, there has recently come to be frequently used, in place of the above-mentioned method, a process using self-adhering electric wires which themselves have adhering properties. When the above process is adopted, desired coils can be obtained with relative ease without applying such varnish-impregnating treatment as in the above-mentioned method.

As the self-adhering insulated electric wires employed in said process, several wires have been proposed. Of these wires, those using polyvinyl butyral as base material for insulating films have been widely employed as typical wires. However, in the production of the conventional self-adhering insulated electric wires, including the case where said polyvinyl butyral is used, there have been such drawbacks as mentioned below.

Since the baking temperature of a basic insulating film, which is to be applied directly to a conductor, is different from that of the self-adhering insulating film, the wire is required to be passed through a high temperature furnace, a low temperature furnace and a high temperature furnace, with the result that the production steps become complex and the production costs become high. Moreover, in case the baking of the self-adhering insulating film has been effected at a relatively low temperature and rate, the film is brought into an incompletely cured state, whereby the long time storage of the wire obtained becomes unreliable and the desired self-adhering property thereof cannot be fully displayed.

In addition, the conventional wire, when shaped into a coil, is not always satisfactory in adhesion of adjacent coiled portions of the wire. Particularly, adhesion between coiled portions of the wire is lowered with increasing temperature and the film of the wire is abraded at the time of the coil-shaping operation. Due to such problems as mentioned above, coils of the conventional self-adhering insulated electric wires have been restricted in application to electrical appliances, which are to be subjected to high temperatures, and the uses thereof have been limited only to portions where no substantial temperature variation is encountered, such as deflecting yokes of televisions.

This invention has been established in order to solve such technical problems as mentioned above.

The invention relates to coil-forming insulated electric wires to be employed in producing coils for use in, for example, communication appliances and the like, and to a method for shaping coils using said insulated electric wires.

An object of the present invention is to provide a coil-forming insulated electric wire which, when shaped into a coil, is prominent in adhesion between the adjacent coiled portions of the wire, and which is far more excellent in abrasion resistance and the like mechanical strength characteristics than conventional coil-forming insulated electric wires.

Another object is to provide a method for forming a coil by use of the above-mentioned electric wire.

A further object is to provide a novel coil-forming insulated electric wire prepared in such a manner that at the time of baking and forming the adhering insulating film of the wire, the baking of the film is effected by passing the wire through only a high temperature furnace without passing through low and high temperature furnaces.

That is, the gist of the present invention resides in the following 3 points:

(1) A coil-forming insulated electric wire obtained by applying and baking onto a conductor, either directly or through an insulating film, an insulating coating material prepared by dissolving in a solvent a base material comprising an alcohol-soluble copolyamide resin or a mixture of said resin with a polyurethane elastomer, and a functional resin which does not react directly with said resin or which more or less reacts therewith but does not form any substantial three-dimensional structure.

(2) A method for forming a coil using an insulated electric wire in which an insulated electric wire, which has been obtained by applying the baking onto a conductor, either directly or through an insulating film, an insulating coating material prepared by dissolving in a solvent a base material comprising an alcohol-soluble copolyamide resin or a mixture of said resin with a polyurethane elastomer, and a functional resin which does not react directly with said resin or which more or less reacts therewith but does not form any substantial three-dimensional structure, is shaped into the form of a coil, is immersed in an alcohol and is then heated thereby adhering to each other the adjacent coiled portions of the electric wire.

(3) A method for forming a coil using an insulated electric wire in which an insulated electric wire, which has been obtained by applying and baking onto a conductor, either directly or through an insulating film, a coating material prepared by dissolving in a solvent a base material comprising an alcohol-soluble copolyamide resin or a mixture of said resin with a polyurethane elastomer, and a functional resin which does not react directly with said resin or which more or less reacts therewith but does not form any substantial three-dimensional structure, is shaped into the form of a coil in an alcohol atmosphere and is then heated, thereby adhering to each other the adjacent coiled portions of the insulated electric wire.

As concrete examples of the above-mentioned alcohol-soluble copolyamide resin, there may be raised "Amilan CM–4001" (trade name for a product of Toyo Rayon K.K.) and "Ultramid I C" (trade name for a product of Badische Co. of Germany) which comprise copolymers of 6,10-nylon and 6- or 6,6-nylon. Further, the functional resin which does not react directly with the polar group of an alcohol-soluble copolyamide resin indicates a functional resin which does not form any three dimensional structure by reaction with a polyamide resin. So far as no three dimensional structure is formed, said resin may be a functional resin within such a scope that the functional group of the resin is substituted by the active hydrogen of a polyamide resin to undergo more or less ester exchange. Such functional resins, which more or less react with the polar groups of polyamide resins but do not form any substantial three dimensional structure, include, for example, thermosetting resins such as melamine, urea, polyester and xylene resins, and ketone, novolak and the like resins.

As the polyurethane elastomers, various known elastomers may be used, but the most preferable is "Paraprene" (trade name for a product of Hodogaya Kagaku K.K.). Further, as the alcohols, methanol, ethanol, propanol, butanol and the like are usable. In practice, however, the use of methanol, which is inexpensive and low in boiling point, is practical.

The formation of a coil by use of the insulated electric wire of the present invention may be carried out in such a manner that the electric wire is shaped into the form of a coil and is then immersed in an alcohol. In this case, the coil formation may also be effected in a so-called alcohol atmosphere by shaping the electric wire into a coil while spraying an alcohol to the electric wire.

In forming the insulated electric wire of the present invention into a coil, the time required for immersing the electric wire in an alcohol or for maintaining the electric wire in an alcohol atmosphere, the drying time and the heating temperature and time to be employed in the subsequent step, vary depending on the shape and size of the desired coil and on the manner of treatment thereof. Ordinarily, however, desired coil formation operations can be effected when the alcohol immersion time is 1–60 seconds, the air drying time is 10–30 minutes and the heating temperature and time in the subsequent step are within the ranges of 100–200° C. and 10 minutes to 5 hours, respectively.

In accordance with the present invention, there is provided an insulated electric wire which has been made abrasion resistant by application of an insulating coating material prepared by using as a base material an alcohol-soluble copolyamide resin or a mixture of said resin with a polyurethane elastomer and blending with said base material a functional resin acting as a kind of curing agent. Further, according to the present invention, there is obtained an insulated electric wire coated with a baked coating material which, when treated with an alcohol and heated, produce a strong adhering force, and portions between adhered layers are agglutinated to provide a proper elasticity. The present invention intends to achieve the desired objects by using said insulated electric wire for the formation of coil.

The relationship between the individual components of the coating material employed in the present invention will be illustrated below.

In preparing the coating material employed in the present invention, a base material comprising the aforesaid alcohol-soluble copolyamide resin, or a mixture of said resin with a polyurethane elastomer, is blended with a functional resin which does not react directly with the polar group of said polyamide resin or which more or less reacts therewith but forms no substantial three-dimensional structure. This blending permits the functional resin to act as a kind of curing agent to attain the following advantages:

The baking of the coating material applied to an electric wire can be effected by passing the electric wire through only the same high temperature furnace as that used in the baking of common insulating films, omitting the steps of passing the electric wire through low and high temperature furnaces, which have been required for the baking of self-adhering insulating films. Further, the insulated electric wires, after forming into coils, can be prevented from mutual adhesion and the portions between bonded layers can be brought into a tough and completely cured state to provide resistance to physical and chemical influence which might be externally applied to the finished coils.

In the present invention, therefore, the baking of the coating material applied to an electric wire can be effected by passing the wire through only a high temperature furnace without using low and high temperature furnaces, which have been required in the conventional method. This signifies that in case a film of the coating material of the present invention is to be formed around a conductor through other insulating film, the baking of the coating material can be effected by use of one furnace under the same operational conditions as in the case of said insulating film. Thus, the operational complexity can be dismissed and the production steps can be shortened, with the result that electric wires can be produced at low costs.

In the above case, the amount of functional resin to be blended is 3–85 parts, preferably 5–75 parts, by weight per 100 parts by weight of the alcohol-soluble copolyamide resin. The outline of the reasons for the regulation in amount of the functional resin, which reasons are based on many experimental results attained by the present inventors, is as mentioned below. That is, if the amount of blended functional resin is less than 3 parts by weight per 100 parts by weight of the alcohol-soluble copolyamide resin, the effect of the blending of functional resin cannot be obtained and a complete prevention of tackiness cannot be attained. In case the tackiness prevention is incomplete, there are caused such drawbacks that in shaping the electric wire into a coil, dust adheres onto the surface of the wire to bring about not only a cause for effecting the electrical characteristics of the wire such as, for example, self-inductance, but also a cause for lowering the operational efficiency of the shaping operation. However, in case the amount of functional resin is increased to 3–5 parts by weight, the above-mentioned problems as to tackiness are avoided to make it possible to obtain coil-forming insulated electric wires and coils having desired properties.

On the other hand, if the amount of functional resin becomes 75–85 parts by weight, the ratio of the blended functional resin to the alcohol-soluble copolyamide resin or a mixture of said resin with a polyurethane elastomer increases and the adhesion between the adjacent coiled portions of electric wire gradually lowers to make it impossible to achieve the improvement in adhesion which is an object of the present invention. It is therefore desirable that the upper limit in amount of the functional resin to be blended be about 85 parts by weight. So far as a desired adhesion can be attained, however, the functional resin may be used in an amount more than 85 parts by weight, depending on the shape and size of the coil to be obtained.

In the next place, the blending of the alcohol-soluble copolyamide resin with a polyurethane elastomer aims to improve such film-forming properties as flexibility and electrolytic corrosion resistance of the polyamide resin as a coating material base and to enhance the characteristics of the whole base material. The amount of the polyurethane elastomer is 2–120 parts by weight per 100 parts by weight of the polyamide resin, and is preferably 5–100 parts by weight in view of the questions of tackiness and lowering in adhesion. The above-mentioned amount, however, is merely illustrative and is not always limitative.

In accordance with the present invention, the insulating coating material may be applied either to a naked conductor comprising aluminum or copper, or to a conductor having other insulating film, such as a formal, polyurethane or polyester wire.

Examples of the present invention are shown in Tables 1 to 8, in which various characteristics tabulated were evaluated and measured according to the following test methods:

The pinhole test, breakdown voltage test, softening test, solvent resistance test and coiling test were individually carried out according to the methods regulated in JIS–C–3203.

The abrasion test was effected by placing a 320 g. weight on an insulated electric wire and reciprocating the weight on the wire, and the abrasion resistance value was represented by the times of reciprocation repeated until the conductor in the electric wire had been exposed.

The adhesion test was effected by applying a tension to both ends of a finished coil of an electric wire, and the value of adhesion was represented by the tension applied when the coiled and bonded portions of the electric wire had been peeled off each other.

The adhesion half-reduction temperature was measured by applying to a finished coil of an electric wire one-half of the value of tension obtained in the adhesion test, placing the coil in a thermostat and increasing the temperature at a rate of 10° C. per minute, and was represented by the temperature of the thermostat when the bonded portions of the electric wire had been peeled off each other.

EXAMPLES

The components employed in the examples and test exmaples shown in Tables 1 to 8 were individually dissolved in solvents to prepare coating materials. The thus prepared coating materials were individually applied to a formal wire, in the case of Tables 1, 2, 5 and 6, and to a polyurethane wire, in the case of Tables 3, 4, 7 and 8. Subsequently, the wires were individually passed at a rate of 18 m. per minute through an electric furnace kept at 400° C. to bake the coating materials, and this operation was repeated, until a desired film thickness could be attained, to obtain coil-forming insulated electric wires.

Each of the insulated electric wires obtained in the above manner was intimately coiled 20 times around a round rod of 5 mm. in diameter, was immersed for 15 seconds in methanol at normal temperature, was heated at 160°±5° C. for 5 minutes and was subjected to tests of various characteristics. The results were as shown in the tables.

In the tables, the coparative examples show the cases of the so-called self-adhering insulated electric wires obtained by applying and baking known polyvinyl butyral onto the aforesaid electric wires.

TABLE 1.—RESULTS OF TESTS OF VARIOUS CHARACTERISTICS WHEN MELAMINE RESIN WAS USED

| | Test Example 1 | Example 1 | Example 2 | Example 3 | Test Example 2 | Comparative example |
|---|---|---|---|---|---|---|
| Components: | | | | | | |
| Ultramid I C. (parts by weight) | 100 | 100 | 100 | 100 | 100 | |
| Melamine resin (parts by weight) | 3 | 5 | 30 | 50 | 55 | |
| Polyvinyl butyral, percent | | | | | | 100 |
| Diameter of conductor (mm.) | 0.350 | 0.350 | 0.350 | 0.350 | 0.350 | 0.351 |
| Diameter of formal wire (mm.) | 0.388 | 0.388 | 0.388 | 0.388 | 0.390 | 0.390 |
| Finished outer diameter (mm.) | 0.420 | 0.419 | 0.420 | 0.420 | 0.420 | 0.421 |
| Number of pinholes (per 5 m.) | 0 | 0 | 0 | 0 | 0 | 0 |
| Breakdown voltage (v.) | 12,000 | 11,900 | 12,000 | 11,400 | 12,000 | 10,900 |
| Softening test (125° C.±2° C., 6 hours) | (1) | (1) | (1) | (1) | (1) | (1) |
| Solvent resistance (benzene) | (1) | (1) | (1) | (1) | (1) | (1) |
| Coiling test | (1) | (1) | (1) | (1) | (1) | (1) |
| Abrasion test | 49 | 53 | 55 | 58 | 54 | 40 |
| Tackiness (after shaping) | (2) | (3) | (3) | (3) | (3) | (3) |
| Adhesion (g.) | 290 | 280 | 270 | 210 | 150 | 150 |
| Adhesion half-reduction temperture (° C.) | 145 | 144 | 148 | 141 | 110 | 80 |

[1] No change. [2] Observed. [3] None.

TABLE 2.—RESULTS OF TESTS OF VARIOUS CHARACTERISTICS WHEN KETONE RESIN WAS USED

| | Test Example 1 | Example 1 | Example 2 | Example 3 | Test Example 2 | Comparative example |
|---|---|---|---|---|---|---|
| Components: | | | | | | |
| Amilan CM-4001 (parts by weight) | 100 | 100 | 100 | 100 | 100 | |
| Ketone resin (parts by weight) | 3 | 5 | 30 | 50 | 55 | |
| Polyvinyl butyral, percent | | | | | | 100 |
| Diameter of conductor (mm.) | 0.351 | 0.351 | 0.351 | 0.351 | 0.351 | 0.351 |
| Diameter of formal wire (mm.) | 0.387 | 0.387 | 0.387 | 0.387 | 0.387 | 0.387 |
| Finished outer diameter (mm.) | 0.415 | 0.145 | 0.416 | 0.416 | 0.417 | 0.418 |
| Number of pinholes (per 5 m.) | 0 | 0 | 0 | 0 | 0 | 0 |
| Breakdown voltage (v.) | 12,100 | 12,000 | 11,900 | 11,000 | 11,400 | 10,900 |
| Softening test (125°±2° C., 6 hours) | (1) | (1) | (1) | (1) | (1) | (1) |
| Solvent resistance (benzene) | (1) | (1) | (1) | (1) | (1) | (1) |
| Coiling test | (1) | (1) | (1) | (1) | (1) | (1) |
| Abrasion test | 48 | 52 | 53 | 60 | 57 | 40 |
| Tackiness (after shaping) | (2) | (3) | (3) | (3) | (3) | (3) |
| Adhesion (g.) | 300 | 280 | 260 | 230 | 170 | 150 |
| Adhesion half-reduction temperature (° C.) | 140 | 140 | 145 | 142 | 110 | 80 |

[1] No change. [2] Observed. [3] None.

TABLE 3.—RESULTS OF TESTS OF VARIOUS CHARACTERISTICS WHEN POLYESTER RESIN WAS USED

| | Test Example 1 | Example 1 | Example 2 | Example 3 | Test Example 2 | Comparative example |
|---|---|---|---|---|---|---|
| Components: | | | | | | |
| Ultramide 1 C. (parts by weight) | 100 | 100 | 100 | 100 | 100 | |
| Polyester resin (parts by weight) | 3 | 5 | 30 | 50 | 55 | |
| Polyvinyl butyral, percent | | | | | | 100 |
| Diameter of conductor (mm.) | 0.350 | 0.350 | 0.350 | 0.350 | 0.350 | 0.351 |
| Diameter of polyurethane wire (mm.) | 0.387 | 0.387 | 0.387 | 0.387 | 0.387 | 0.387 |
| Finished outer diameter (mm.) | 0.418 | 0.418 | 0.418 | 0.148 | 0.418 | 0.420 |
| Number of pinholes (per 5 m.) | 0 | 0 | 0 | 0 | 0 | 0 |
| Breakdown voltage (v.) | 13,000 | 12,800 | 12,600 | 12,800 | 12,400 | 12,000 |
| Softening test (125°±2° C., 6 hours) | (1) | (1) | (1) | (1) | (1) | (1) |
| Solvent resistance (benzene) | (1) | (1) | (1) | (1) | (1) | (1) |
| Coiling test | (1) | (1) | (1) | (1) | (1) | (1) |
| Abrasion test | 51 | 53 | 58 | 60 | 58 | 40 |
| Tackiness (after shaping) | (2) | (3) | (3) | (3) | (3) | (2) |
| Adhesion (g.) | 280 | 280 | 270 | 240 | 150 | 150 |
| Adhesion half-reduction temperature (° C.) | 148 | 145 | 151 | 143 | 120 | 80 |

[1] No change.  [2] Observed.  [3] None.

TABLE 4.—RESULTS OF TESTS OF VARIOUS CHARACTERISTICS WHEN XYLENE RESIN WAS USED

| | Test Example 1 | Example 1 | Example 2 | Example 3 | Test Example 2 | Comparative example |
|---|---|---|---|---|---|---|
| Components: | | | | | | |
| Amilan CM-4001 (parts by weight) | 100 | 100 | 100 | 100 | 100 | |
| Xylene resin (parts by weight) | 3 | 5 | 30 | 50 | 55 | |
| Polyvinyl butyral, percent | | | | | | 100 |
| Diameter of conductor (mm.) | 0.350 | 0.350 | 0.350 | 0.350 | 0.350 | 0.351 |
| Diameter of polyurethane wire (mm.) | 0.387 | 0.387 | 0.387 | 0.387 | 0.387 | 0.387 |
| Finished outer diameter (mm.) | 0.418 | 0.418 | 0.418 | 0.418 | 0.418 | 0.420 |
| Number of pinholes (per 5 m.) | 0 | 0 | 0 | 0 | 0 | 0 |
| Breakdown voltage (v.) | 13,000 | 12,800 | 12,600 | 12,800 | 12,400 | 12,000 |
| Softening test (125±2° C., 6 hours) | (1) | (1) | (1) | (1) | (1) | (1) |
| Solvent resistance (benzene) | (1) | (1) | (1) | (1) | (1) | (1) |
| Coiling test | (1) | (1) | (1) | (1) | (1) | (1) |
| Abrasion test | 48 | 51 | 52 | 59 | 57 | 40 |
| Tackiness (after shaping) | (2) | (3) | (3) | (3) | (3) | (3) |
| Adhesion (g.) | 295 | 285 | 265 | 215 | 160 | 150 |
| Adhesion half-reduction temperature (° C.) | 142 | 140 | 146 | 138 | 110 | 80 |

[1] No change.  [2] Observed.  [3] None.

TABLE 5.—RESULTS OF TESTS OF VARIOUS CHARACTERISTICS WHEN MELAMINE RESIN WAS USED

| | Test Example 1 | Example 1 | Example 2 | Example 3 | Test Example 2 | Comparative example |
|---|---|---|---|---|---|---|
| Components: | | | | | | |
| Ultramid 1 C. (parts by weight) | 100 | 100 | 100 | 100 | 100 | |
| Paraprene (parts by weight) | 1 | 5 | 30 | 70 | 120 | |
| Melamine resin (parts by weight) | 2 | 5 | 25 | 50 | 85 | |
| Polyvinyl butyral, percent | | | | | | 100 |
| Diameter of conductor (mm.) | 0.350 | 0.350 | 0.350 | 0.350 | 0.350 | 0.351 |
| Diameter of formal wire (mm.) | 0.387 | 0.387 | 0.387 | 0.387 | 0.388 | 0.388 |
| Finished outer diameter (mm.) | 0.418 | 0.418 | 0.418 | 0.418 | 0.419 | 0.420 |
| Number of pinholes (per 5 m.) | 0 | 0 | 0 | 0 | 0 | 0 |
| Breakdown voltage (v.) | 12,000 | 11,900 | 12,000 | 11,800 | 12,000 | 10,900 |
| Softening test (125°±2°C., 6 hours) | (1) | (1) | (1) | (1) | (1) | (1) |
| Solvent resistance (benzene) | (1) | (1) | (1) | (1) | (1) | (1) |
| Coiling test | (1) | (1) | (1) | (1) | (1) | (1) |
| Abrasion test | 49 | 53 | 55 | 58 | 60 | 40 |
| Tackiness (after shaping) | (2) | (3) | (3) | (3) | (3) | (3) |
| Adhesion (g.) | 290 | 280 | 270 | 240 | 200 | 150 |
| Adhesion half-reduction temperature (° C.) | 145 | 144 | 148 | 141 | 140 | 80 |

[1] No change.  [2] Observed.  [3] None.

TABLE 6.—RESULTS OF TESTS OF VARIOUS CHARACTERISTICS WHEN KETONE RESIN WAS USED

| | Test Example 1 | Example 1 | Example 2 | Example 3 | Test Example 2 | Comparative example |
|---|---|---|---|---|---|---|
| Components: | | | | | | |
| Amilan CM-4001 (parts by weight) | 100 | 100 | 100 | 100 | 100 | |
| Paraprene (parts by weight) | 2 | 10 | 40 | 80 | 130 | |
| Ketone resin (parts by weight) | 3 | 12 | 30 | 60 | 90 | |
| Polyvinyl butyral, percent | | | | | | 100 |
| Diameter of conductor (mm.) | 0.350 | 0.350 | 0.350 | 0.350 | 0.350 | 0.350 |
| Diameter of formal wire (mm.) | 0.387 | 0.387 | 0.387 | 0.387 | 0.387 | 0.387 |
| Finished outer diameter (mm.) | 0.419 | 0.419 | 0.419 | 0.419 | 0.419 | 0.420 |
| Number of pinholes (per 5 m.) | 0 | 0 | 0 | 0 | 0 | 0 |
| Breakdown voltage (v.) | 12,100 | 12,000 | 11,900 | 11,600 | 11,400 | 10,900 |
| Softening test (125°±2° C., 6 hours) | (1) | (1) | (1) | (1) | (1) | (1) |
| Solvent resistance (benzene) | (1) | (1) | (1) | (1) | (1) | (1) |
| Coiling test | (1) | (1) | (1) | (1) | (1) | (1) |
| Abrasion test | 48 | 53 | 54 | 48 | 60 | 40 |
| Tackiness (after shaping) | (2) | (3) | (3) | (3) | (3) | (3) |
| Adhesion (g.) | 290 | 280 | 270 | 240 | 200 | 150 |
| Adhesion half-reduction temperature (° C.) | 145 | 146 | 148 | 140 | 138 | 80 |

[1] No change.  [2] Observed.  [3] None.

TABLE 7.—RESULTS OF TESTS OF VARIOUS CHARACTERISTICS WHEN POLYESTER RESIN WAS USED

|  | Test Example 1 | Example 1 | Example 2 | Example 3 | Test Example 2 | Comparative example |
|---|---|---|---|---|---|---|
| Components: |  |  |  |  |  |  |
| Ultramid 1 C. (parts by weight) | 100 | 100 | 100 | 100 | 100 | |
| Paraprene (parts by weight) | 3 | 15 | 50 | 90 | 140 | |
| Polyester resin (parts by weight) | 4 | 16 | 35 | 70 | 95 | |
| Polyvinyl butyral, percent |  |  |  |  |  | 100 |
| Diameter of conductor (mm.) | 0.350 | 0.350 | 0.350 | 0.350 | 0.350 | 0.350 |
| Diameter of polyurethane wire (mm.) | 0.387 | 0.387 | 0.387 | 0.387 | 0.387 | 0.387 |
| Finished outer diameter (mm.) | 0.418 | 0.418 | 0.418 | 0.418 | 0.418 | 0.420 |
| Number of pinholes (per 5 m.) | 0 | 0 | 0 | 0 | 0 | 0 |
| Breakdown voltage (v.) | 13,000 | 12,800 | 12,600 | 12,800 | 12,400 | 12,000 |
| Softening test (125°±2° C., 6 hours) | (1) | (1) | (1) | (1) | (1) | (1) |
| Solvent resistance (benzene) | (1) | (1) | (1) | (1) | (1) | (1) |
| Coiling test | (1) | (1) | (1) | (1) | (1) | (1) |
| Abrasion test | 50 | 52 | 58 | 61 | 63 | 40 |
| Tackiness (after shaping) | (2) | (3) | (3) | (2) | (3) | (3) |
| Adhesion (g.) | 280 | 270 | 270 | 240 | 210 | 150 |
| Adhesion half-reduction temperature (° C.) | 148 | 145 | 145 | 143 | 140 | 80 |

[1] No change. [2] Slight. [3] None.

|  | Test Example 1 | Example 1 | Example 2 | Example 3 | Test Example 2 | Comparative example |
|---|---|---|---|---|---|---|
| Components: |  |  |  |  |  |  |
| Amilan CM-4001 (parts by weight) | 100 | 100 | 100 | 100 | 100 | |
| Paraprene (parts by weight) | 4 | 20 | 60 | 100 | 150 | |
| Xylene resin (parts by weight) | 5 | 20 | 40 | 75 | 100 | |
| Polyvinyl butyral, percent |  |  |  |  |  | 100 |
| Diameter of conductor (mm.) | 0.350 | 0.350 | 0.350 | 0.350 | 0.350 | 0.350 |
| Diameter of polyurethane wire (mm.) | 0.387 | 0.387 | 0.387 | 0.387 | .0387 | 0.387 |
| Finished outer diameter (mm.) | 0.418 | 0.418 | 0.418 | 0.418 | 0.418 | 0.418 |
| Number of pinholes (per 5 m.) | 0 | 0 | 0 | 0 | 0 | 0 |
| Breakdown voltage (v.) | 13,000 | 12,600 | 12,300 | 12,400 | 12,000 | 12,000 |
| Softening test (125° ± 2° C., 6 hours) | (1) | (1) | (1) | (1) | (1) | (1) |
| Solvent resistance (benzene) | (1) | (1) | (1) | (1) | (1) | (1) |
| Coiling test | (1) | (1) | (1) | (1) | (1) | (1) |
| Abrasion test | 50 | 51 | 56 | 57 | 55 | 40 |
| Adhesion (after shaping) | (2) | (2) | (2) | (2) | (2) | (2) |
| Adhesion (g.) | 280 | 270 | 260 | 240 | 220 | 150 |
| Adhesion half-reduction temperature (° C.) | 141 | 142 | 145 | 140 | 141 | 80 |

[1] No change. [2] Slight. [3] None.

As is clear from the above tables, the insulated electric wires in accordance with the present invention (Examples 1 to 3 in each table) are substantially equal, to the conventional electric wires (Comparative Example in each table), a breakdown voltage, coiling property, number of pinholes, softening resistance and solvent resistance, but are considerably improved in abrasion resistance as compared therewith. This indicates the fact that coils obtained according to the present invention are applicable to mechanically more severe uses than in the case of the conventional coils. Further, it is recognized that the coils of Examples 1 to 3 in each table are not only more prominent in adhesion in the normal state than those of the Comparative Examples, but also show far more excellent values in resistance to temperature increase, i.e. in adhesion half-reduction temperature. This signifies the fact that the coils according to the present invention are applicable to electric machines and appliances which are anticipated to be increased in temperature, such as motors and the like. Thus, it is obvious that the coils of the present invention are greatly broadened in scope of uses as compared with the case of conventional coils.

We claim:

1. An insulated wire for use in forming coils comprising a conductor and an insulating coating over said conductor consisting essentially of a major amount of an alcohol-soluble copolyamide and at least 3 to 85 parts by weight per 100 parts by weight of said copolyamide of at least one thermosetting synthetic resin which is a curing agent for said copolyamide and does not react with said copolyamide to form a three-dimensional structure, said wire being cured to a tack-free condition with said thermosetting synthetic resin.

2. An insulated wire according to claim 1, wherein said coating additionally includes a polyurethane elastomer.

3. An insulated wire according to claim 1, wherein 5 to 75 parts by weight of said thermosetting synthetic resin is employed per 100 parts by weight of said copolyamide.

4. An insulated wire according to claim 1, wherein 5 to 100 parts by weight of a polyurethane elastomer and 5 to 75 parts by weight of said thermosetting resin are employed per 100 parts by weight of said copolyamide.

5. An insulated wire according to claim 1, wherein said thermosetting synthetic resin is selected from the group consisting of melamine, urea, polyester, xylene, ketone and novolak resins.

6. An insulated wire according to claim 1, wherein said copolyamide is a copolymer of 6,10-nylon and 6- or 6,6-nylon.

7. An insulated wire for use in forming coils comprising a conductor, an insulating material coating over said conductor and an alcohol-soluble coating applied on the insulating coating and consisting essentially of a major amount of an alcohol-soluble copolyamide and at least 3 to 85 parts by weight per 100 parts by weight of said copolyamide of at least one thermosetting synthetic resin which is a curing agent for said copolyamide and does not react with said copolyamide to form a three-dimensional structure, said wire being cured to a tack-free condition with said thermosetting synthetic resin.

8. An insulated wire according to claim 7, wherein said coating additionally includes a polyurethane elastomer.

9. An insulated wire according to claim 7, wherein 5 to 75 parts by weight of said thermosetting synthetic resin is employed per 100 parts by weight of said copolyamide.

10. An insulated wire according to claim 7, wherein 5 to 100 parts by weight of a polyurethane elastomer and 5 to 75 parts by weight of said thermosetting synthetic resin are employed per 100 parts by weight of said copolyamide.

11. An insulated wire according to claim 10, wherein said thermosetting synthetic resin is selected from the group consisting of melamine, urea, polyester, xylene, ketone and novolak resins.

12. An insulated wire according to claim 10, wherein said copolyamide is a copolymer of 6,10-nylon and 6- or 6,6-nylon.

References Cited

UNITED STATES PATENTS

| | | | |
|---|---|---|---|
| 3,249,563 | 5/1966 | Balk | 260—858 |
| 3,239,598 | 3/1966 | Olson et al. | 117—232 |
| 2,349,952 | 5/1944 | Fuller | 260—857PE |

WILLIAM D. MARTIN, Primary Examiner

R. M. SPEER, Assistant Examiner

U.S. Cl. X.R.

117—232